(12) United States Patent
Tian et al.

(10) Patent No.: US 9,147,066 B1
(45) Date of Patent: Sep. 29, 2015

(54) SYSTEMS AND METHODS FOR PROVIDING CONTROLS FOR APPLICATION BEHAVIOR

(71) Applicant: Symantec Corporation, Mountain View, CA (US)

(72) Inventors: Xue Feng Tian, Los Angeles, CA (US); Barry Laffoon, Glendale, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 154 days.

(21) Appl. No.: 13/952,522

(22) Filed: Jul. 26, 2013

(51) Int. Cl.
  *G06F 7/04* (2006.01)
  *G06F 12/00* (2006.01)
  *G06F 12/14* (2006.01)
  *G06F 13/00* (2006.01)
  *G06F 17/30* (2006.01)
  *G11C 7/00* (2006.01)
  *G06F 21/44* (2013.01)

(52) U.S. Cl.
  CPC ..................................... *G06F 21/44* (2013.01)

(58) Field of Classification Search
  CPC ....................................................... G06F 21/44
  USPC ............................................................ 726/17
  See application file for complete search history.

(56) References Cited

U.S. PATENT DOCUMENTS

| 5,414,846 | A * | 5/1995 | Lemble et al. ..................... 713/1 |
| 8,656,465 | B1 * | 2/2014 | Fong-Jones ....................... 726/5 |
| 8,763,080 | B2 * | 6/2014 | Carrara et al. ..................... 726/2 |
| 2004/0010327 | A1 * | 1/2004 | Terashima et al. .............. 700/83 |
| 2005/0114672 | A1 * | 5/2005 | Duncan et al. ................ 713/182 |
| 2008/0022396 | A1 * | 1/2008 | Kado .............................. 726/19 |
| 2013/0055347 | A1 * | 2/2013 | Chawla et al. ..................... 726/3 |
| 2013/0097659 | A1 * | 4/2013 | Das et al. ........................... 726/1 |
| 2014/0020083 | A1 * | 1/2014 | Fetik .............................. 726/11 |

OTHER PUBLICATIONS

Bruce McCorkendale et al.; Systems and Methods for Detecting Malware; U.S. Appl. No. 13/422,702, filed Mar. 16, 2012.
Jun Mao et al.; Systems and Methods for Monitoring Application Resource Usage on Mobile Computing Systems; U.S. Appl. No. 13/452,719, filed Apr. 20, 2012.
Bruce McCorkendale et al.; Systems and Methods for Remotely Configuring Applications; U.S. Appl. No. 13/914,599, filed Jun. 10, 2013.

* cited by examiner

*Primary Examiner* — Dant Shaifer Harriman
(74) *Attorney, Agent, or Firm* — ALG Intellectual Property, LLC

(57) ABSTRACT

A computer-implemented method for providing controls for application behavior may include (1) identifying an application that is distributed via an application repository and that is configured to use a permission on a computing platform that enables the application to access a feature of the computing platform, (2) receiving a request to reconfigure the application to intercept and interfere with attempts by the application to use the permission, (3) reconfiguring the application, in response to the request, to intercept and interfere with attempts by the application to use the permission, (4) determining that an updated version of the application is available via the application repository, and (5) reconfiguring the updated version of the application to intercept and interfere with attempts by the application to use the permission in response to an instruction to update the application. Various other methods, systems, and computer-readable media are also disclosed.

20 Claims, 6 Drawing Sheets

US 9,147,066 B1

SYSTEMS AND METHODS FOR PROVIDING CONTROLS FOR APPLICATION BEHAVIOR

BACKGROUND

With the rise of mobile computing, devices such as cellular telephones, tablet computers, and e-book readers, have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms may sometimes inadvertently host malware.

Additionally, legitimate applications without malware may pose privacy concern to users. For example, some mobile computing platforms may provide installed applications access to potentially sensitive device data and user data (as well as access to various other features of the mobile computing platforms). Traditional systems for controlling applications' access to sensitive data and features have included a permissions scheme that requires an application to have a permission for each potentially sensitive feature of a mobile computing platform that a given application wishes to access. These traditional systems may display which permissions an application requires (e.g., at the time of installation), allowing users to accept the required permissions list and install the application or refuse the required permissions list and forgo installing the application. Unfortunately, these traditional systems may require users to make potentially undesirable tradeoffs when deciding whether or not to install applications. Some users may wish to install and use an application without worrying about how the application might exploit the permissions that it requires. Furthermore, users may soon lose track of which applications are exploiting which permissions.

Accordingly, the instant disclosure identifies and addresses a need for additional and improved systems and methods for providing controls for application behavior.

SUMMARY

As will be described in greater detail below, the instant disclosure generally relates to systems and methods for providing controls for application behavior by reconfiguring applications to control the applications' attempts to use permissions. These systems and methods may also facilitate updating these applications and reconfiguring the updated versions of these applications to continue control of the applications' attempts to use permissions.

In one example, a computer-implemented method for providing controls for application behavior may include (1) identifying an application that is distributed via an application repository and that is configured to use a permission on a computing platform that enables the application to access a feature of the computing platform, (2) receiving a request to reconfigure the application to intercept and interfere with attempts by the application to use the permission, (3) reconfiguring the application, in response to the request, to intercept and interfere with attempts by the application to use the permission, (4) determining that an updated version of the application is available via the application repository, and (5) reconfiguring the updated version of the application to intercept and interfere with attempts by the application to use the permission in response to an instruction to update the application.

In some examples, reconfiguring the updated version of the application may include wrapping the updated version of the application in an application wrapper that intercepts and interferes with attempts by the application to use the permission. In these examples, determining that the updated version of the application is available may include monitoring the application repository for the updated version of the application. Additionally or alternatively, reconfiguring the updated version of the application may include providing settings to the updated version of the application via a library included within the application. In this example, the library included within the application may communicate with an agent running on the computing platform that specifies that the application is subject to reconfiguration to intercept and interfere with attempts by the application to use the permission.

In some examples, reconfiguring the updated version of the application may include reconfiguring the updated version of the application to intercept and interfere with attempts by the application to access information that implicates privacy of a user of the computing platform. For example, reconfiguring the updated version of the application may include reconfiguring the updated version of the application to access false information about at least one of (1) a location of the computing platform, (2) a telephone number of the computing platform, (3) a unique identifier of the computing platform, and/or (4) contact information stored on the computing platform.

In some additional examples, reconfiguring the updated version of the application may include preventing the updated version of the application from at least one of (1) accessing a network connection on the computing platform, (2) accessing a positioning device on the computing platform, and/or (3) executing in the background of the computing platform.

In some examples, receiving the request to reconfigure the application to intercept and interfere with attempts by the application to use the permission may include (1) displaying a representation of the permission via a graphical user interface, (2) displaying a representation of the application via the graphical user interface, and (3) receiving a selection via the graphical user interface to interfere with use of the permission by the application.

In some examples, identifying the application may include: (1) identifying a reputation score for the application, and (2) determining, based on the reputation score, that the application is not trusted.

In one embodiment, a system for implementing the above-described method may include (1) an identification module that identifies an application that is distributed via an application repository and that is configured to use a permission on a computing platform that enables the application to access a feature of the computing platform, (2) a receiving module that receives a request to reconfigure the application to intercept and interfere with attempts by the application to use the permission, (3) a reconfiguration module that reconfigures the application, in response to the request, to intercept and interfere with attempts by the application to use the permission, (4) a determination module that determines that an updated version of the application is available via the application repository, (5) an updating module that reconfigures the updated version of the application to intercept and interfere with attempts by the application to use the permission in response to an instruction to update the application, and (6) at least one processor configured to execute the identification module, the receiving module, the reconfiguration module, the determination module, and the updating module.

In some examples, the above-described method may be encoded as computer-readable instructions on a computerreadable-storage medium. For example, a computer-readable-storage medium may include one or more computer-executable instructions that, when executed by at least one processor of a computing device, may cause the computing device to (1) identify an application that is distributed via an application repository and that is configured to use a permission on a computing platform that enables the application to access a feature of the computing platform, (2) receive a request to reconfigure the application to intercept and interfere with attempts by the application to use the permission, (3) reconfigure the application, in response to the request, to intercept and interfere with attempts by the application to use the permission, (4) determine that an updated version of the application is available via the application repository, and (5) reconfigure the updated version of the application to intercept and interfere with attempts by the application to use the permission in response to an instruction to update the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
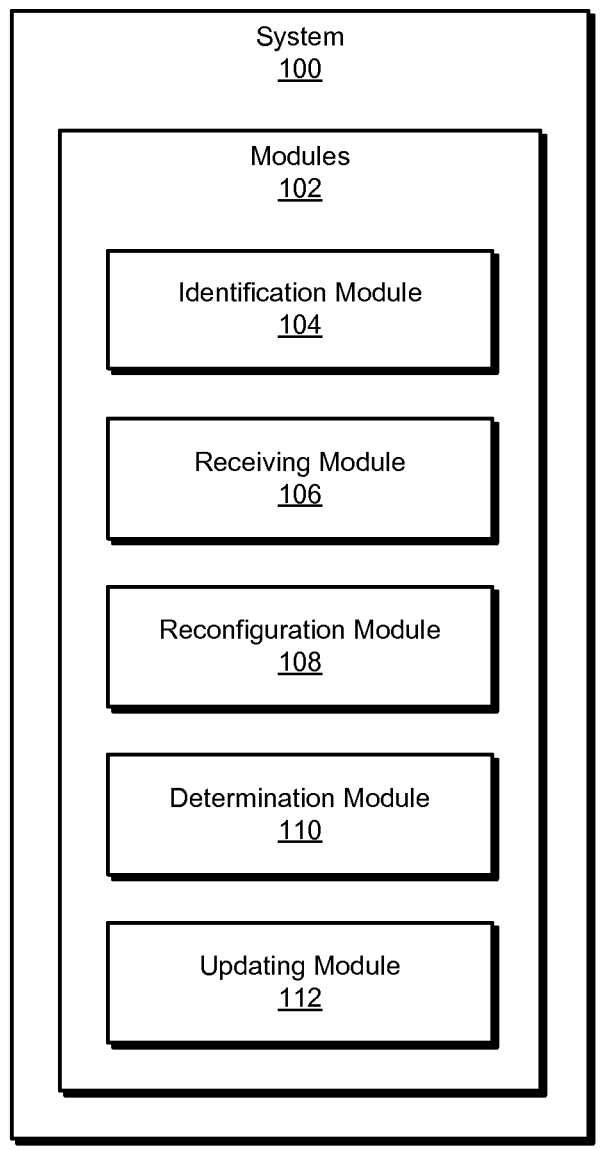
FIG. 1 is a block diagram of an exemplary system for providing controls for application behavior.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for providing controls for application behavior. As will be explained in greater detail below, by reconfiguring applications to control the applications' attempts to use permissions, the systems and methods described herein may allow users to install applications and customize what information the applications can access and/or what actions the applications can perform. Furthermore, by facilitating the updating of these applications and reconfiguring the updated versions of these applications to continue control of the applications' attempts to use permissions, these systems and methods may ensure that user experience with the applications is unhindered.

Figure 2:
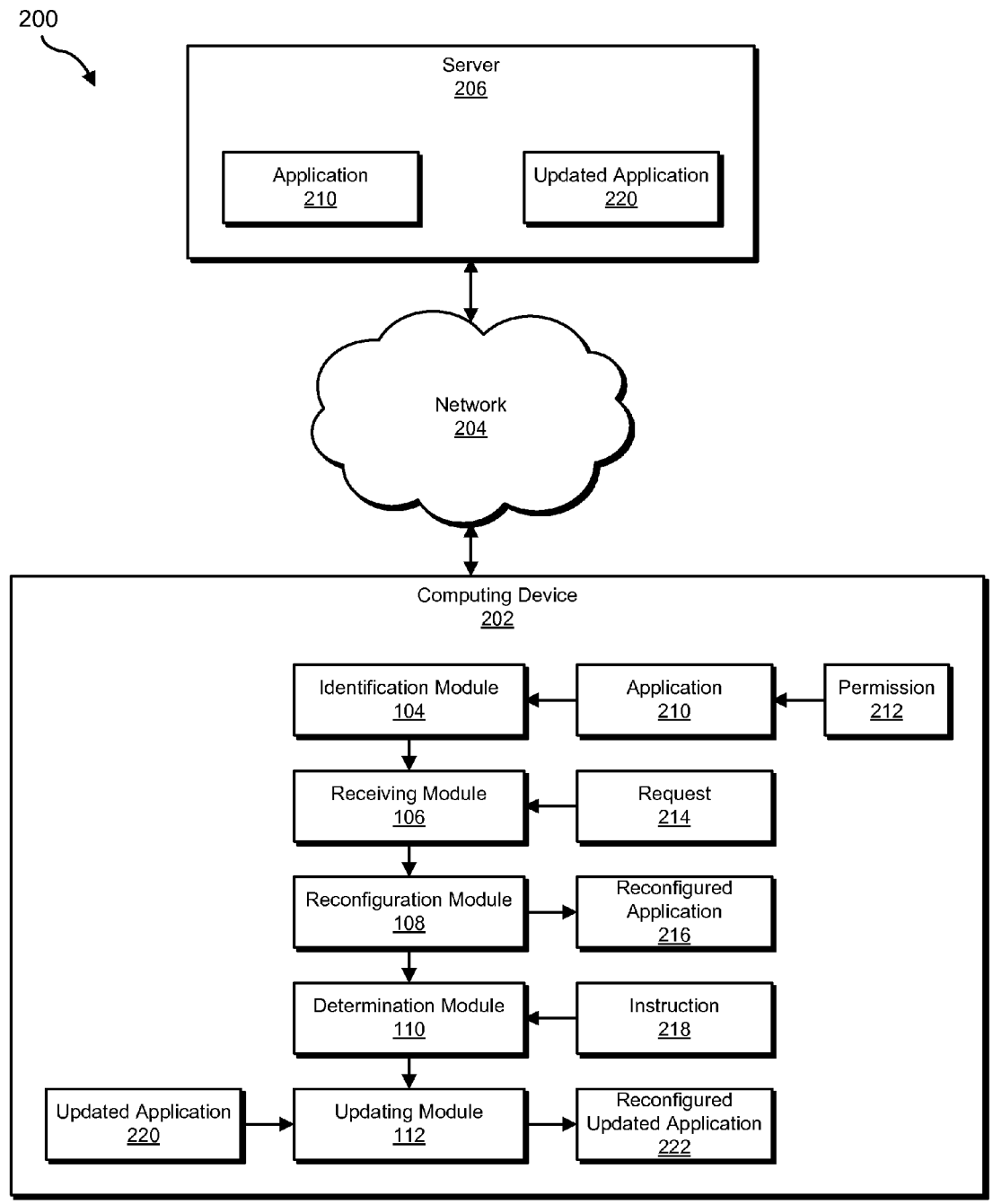
FIG. 2 is a block diagram of an exemplary system for providing controls for application behavior.
Figure 3:
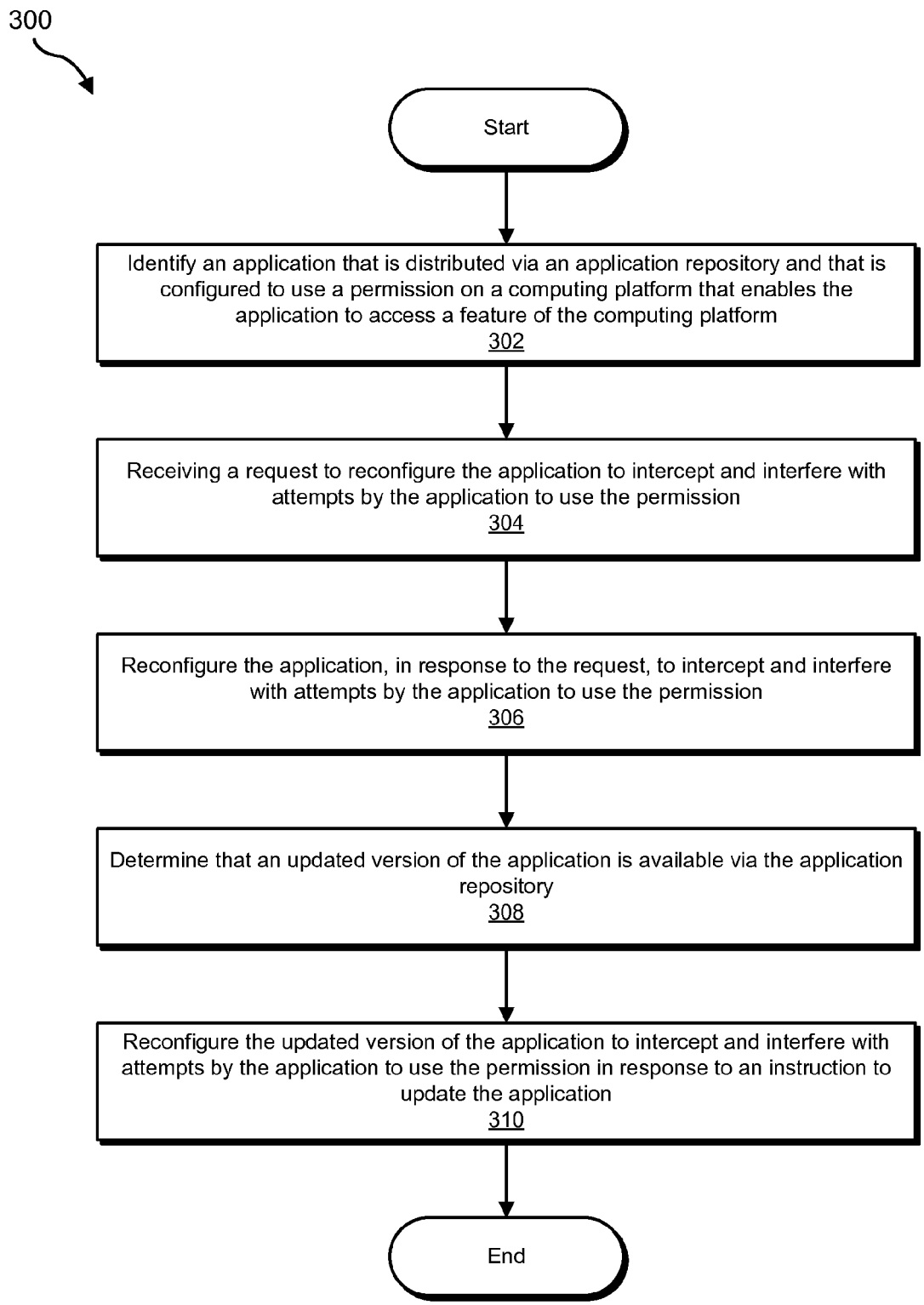
FIG. 3 is a flow diagram of an exemplary method for providing controls for application behavior.
Figure 4:
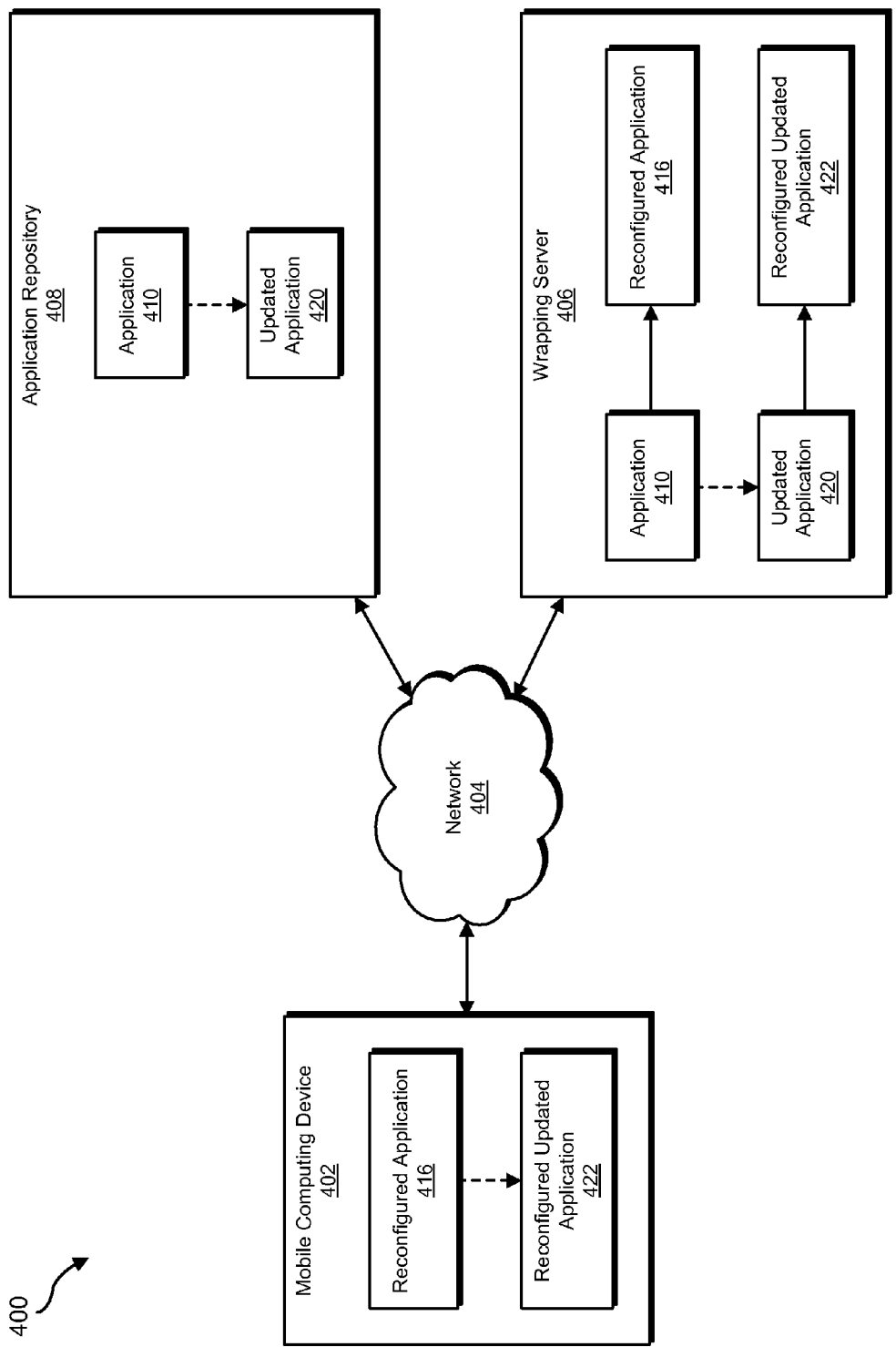
FIG. 4 is a block diagram of an exemplary system for providing controls for application behavior.

The following will provide, with reference to FIGS. 1, 2, and 4, detailed descriptions of exemplary systems for providing controls for application behavior. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for providing controls for application behavior. As illustrated in this figure, exemplary system 100 may include one or more modules 102 for performing one or more tasks. For example, and as will be explained in greater detail below, exemplary system 100 may also include an identification module 104 that may identify an application that may be distributed via an application repository and that may be configured to use a permission on a computing platform that enables the application to access a feature of the computing platform. Exemplary system 100 may additionally include a receiving module 106 that may receive a request to reconfigure the application to intercept and interfere with attempts by the application to use the permission. Exemplary system 100 may also include a reconfiguration module 108 that may reconfigure the application, in response to the request, to intercept and interfere with attempts by the application to use the permission. Exemplary system 100 may additionally include a determination module 110 that may determine that an updated version of the application may be available via the application repository. Exemplary system 100 may also include an updating module 112 that may reconfigure the updated version of the application to intercept and interfere with attempts by the application to use the permission in response to an instruction to update the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in providing controls for application behavior. For example, and as will be described in greater detail below, one or more of modules 102 may cause computing device 202 and/or server 206 to provide controls for application behavior. For example, and as will be described in greater detail below, identification module 104 may be programmed to identify an application 210 that is distributed via an application repository (e.g., server 206) and that is configured to use a permission 212 on a computing platform (e.g., computing device 202) that enables application 210 to access a feature of the computing platform. Receiving module 106 may be programmed to receive a request 214 to reconfigure application 210 to intercept and interfere with attempts by application 210 to use permission 212. Reconfiguration module 108 may be programmed to reconfigure application 210, in response to request 214, to intercept and interfere with attempts by application 210 to use permission 212 (e.g., resulting in a reconfigured application 216). Determination module 110 may be programmed to determine that an updated version of application 210 (e.g., updated application 220) is available via application 210 repository. Updating module 112 may be programmed to reconfigure the updated application 220 to intercept and interfere with attempts by updated application 220 to use permission 212 in response to an instruction 218 to update application 210 (e.g., resulting in a reconfigured updated application 222).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of hosting, relaying, and/or identifying applications. Examples of server 206 include, without limitation, application servers and database servers configured to provide various database services and/or run certain software applications. In some examples, server 206 may include an application repository.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for providing controls for application behavior. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application that is distributed via an application repository and that is configured to use a permission on a computing platform that enables the application to access a feature of the computing platform. For example, at step 302 identification module 104 may, as part of computing device 202 in FIG. 2, identify application 210 that is distributed via an application repository (e.g., server 206) and that is configured to use permission 212 on a computing platform (e.g., computing device 202) that enables application 210 to access a feature of the computing platform.

As used herein, the term "application" may refer to any application, program, module, and/or package that may be installed on and/or that may execute on a computing platform. As used herein, the phrase "computing platform" may any computing device, software framework, and/or combination thereof. In some examples, the computing platform may include a mobile computing platform. The phrase "mobile computing platform" may generally refer to any portable computing device onto which applications may be installed. Examples of mobile computing platforms include, without limitation, mobile phones, tablet computers, e-book readers, personal digital assistants, GPS devices, messaging devices, smartwatches, and head-mounted computing devices.

In some examples, the computing platform may include a restricted platform that may maintain permissions for applications that define which features of the restricted platform that each application may access. As used herein, the term "permission" may refer to any permission, privilege, designated access right, and/or authentication for accessing, using, manipulating, and/or viewing a computing resource and/or capability. In some examples, the permission may be granted by a user at the time of installation of the application. For example, the mobile computing platform may be configured to display one or more permissions required and/or used by the application and to receive verification that the user will grant the permissions to the application before installing and/or executing the application. In some examples, the mobile computing platform may divide a set of capabilities of the mobile computing system into a set of permissions to access the capabilities, and grant a subset of permissions to each installed application.

As used herein, the phrase "application repository" may refer to any source for applications and updates to applications. Examples of application repositories include, without limitation, application stores and digital distribution platforms. In some examples, the phrase "application repository" may refer to an intermediate source of applications that retrieves applications from an application store and/or digital distribution platform.

Identification module 104 may identify the application in any suitable context. For example, identification module 104 may operate on the computing platform and identify an attempt to install the application on the computing platform. Additionally or alternatively, identification module 104 may identify the application already installed on the computing platform. In some examples, as will be discussed in greater detail below, identification module 104 may identify the application in response to receiving a request to reconfigure the application. In another context, identification module 104 may identify the application on a separate computing device (e.g., that acts as a proxy between a digital distribution platform and the computing platform). In this context, identification module 104 may identify the application in response to identifying a request by the computing platform to install and/or reconfigure the application.

In some examples, identification module 104 may identify the application based at least in part on a reputation score for the application. In these examples, identification module 104 may determine, based on the reputation score, that the application is not trusted. One or more of the systems described herein may therefore facilitate control of the behavior and/or permissions of the application in response to determining that the application is not trusted. As used here, the phrase "reputation score" may refer to any of a variety of trust metrics. Examples of reputation scores may include user ratings and/or a number of installations. In some examples, a reputation score may also account for reports of system infections and/or instability correlated with the installation of the application and/or a reputation of a publisher of the application.

FIG. 4 illustrates an exemplary system 400 in which identification module 104 may operate. As shown in FIG. 4, exemplary system 400 may include a mobile computing device 402, a wrapping server 406, and an application repository 408 in communication via a network 404. Using FIG. 4 as an example, identification module 104 may, as a part of wrapping server 406, identify an application 410 that is distributed via application repository 408 and that is configured to use a permission on mobile computing platforms such as mobile computing device 402.

Returning to FIG. 3, at step 304 one or more of the systems described herein may receive a request to reconfigure the application to intercept and interfere with attempts by the application to use the permission. For example, at step 304 receiving module 106 may, as part of computing device 202 in FIG. 2, reconfigure application 210, in response to request 214, to intercept and interfere with attempts by application 210 to use permission 212 (e.g., resulting in a reconfigured application 216).

Receiving module 106 may receive the request to reconfigure the application in any suitable context. For example, receiving module 106 may operate on the computing platform and may receive the request to reconfigure the application by identifying a setting (e.g., directed to the application specifically and/or a system-wide setting) that specifies a restriction on the application with respect to the permission. Additionally or alternatively, receiving module 106 may receive a message from a central administration server (e.g., initiated by an administrator who controls permissions for applications installed on one or more devices) requesting the reconfiguration of the application. In another context, receiving module 106 may receive the request to reconfigure the application on a separate computing device (e.g., that acts as a proxy between a digital distribution platform and the computing platform). For example, receiving module 106 may receive the request to reconfigure the application by receiving a message from the computing platform indicating an attempt to install the application on the computing platform (and/or indicating that the application is installed on the computing platform) and/or indicating a restriction on the application requested by a user of the computing platform.

In some examples, receiving module 106 may receive the request via a graphical user interface. For example, receiving module 106 may display a representation of the permission via the graphical user interface, display a representation of the application via the graphical user interface, and receive a selection via the graphical user interface to interfere with use of the permission by the application. In one example, receiving module 106 may enable a user to select an application (e.g., from a list of applications installed and/or to be installed on the computing platform) and then display a list of permissions requested and/or required by the application. The user may then select which permissions to disable and/or interfere with. In some examples, the permission may relate to the application accessing a specified type of information, and the user may enter alternative information to present to the application.

In some examples, receiving module 106 may operate within exemplary system 400 in FIG. 4. For example, at step 304 receiving module 106 may, as a part of wrapping server 406, receive a request to reconfigure application 410. In one example, wrapping server 406 may receive the request from mobile computing device 402.

Returning to FIG. 3, at step 306 one or more of the systems described herein may reconfigure the application, in response to the request, to intercept and interfere with attempts by the application to use the permission. For example, at step 306 reconfiguration module 108 may, as part of computing device 202 in FIG. 2, reconfigure application 210, in response to request 214, to intercept and interfere with attempts by application 210 to use permission 212.

Reconfiguration module 108 may reconfigure the application to intercept and interfere with attempts by the application to use the permission in any of a variety of ways. In some examples, reconfiguration module 108 may wrap the application in an application wrapper that intercepts and interferes with attempts by the application to use the permission. For example, the application wrapper may include one or more computer-executable instructions configured to intercept one or more system calls and/or application programming interface calls to the computing platform by the application that would enable the application to access a feature of the computing platform according to the permission. The application wrapper may then block the intercepted call, add instructions to the intercepted call, and/or replace the intercepted call with different instructions. Reconfiguration module 108 and/or the application wrapper may use any suitable hooking technique to intercept and modify calls by the application. For example, reconfiguration module 108 may modify a lookup table for application programming interface calls to redirect to instructions provided within the application wrapper.

In some examples, reconfiguration module 108 may reconfigure the application to intercept and interfere with attempts by the application to use the permission by providing settings to the application via a library included within the application. For example, a wrapper library may be made available to application developers (e.g., to enhance functionality of applications). Reconfiguration module 108 may communicate with the wrapper library within the application to specify which application programming interface calls to hook and/or what instructions are to replace application programming interface calls that use specified permissions and/or features and/or that cause specified behaviors. As mentioned above, in some examples the wrapper library may also provide additional functionality to the application. For example, the wrapper library may provide single sign-on functionality, cloud-based storage functionality, virtual private network functionality at the application level, application certification functionality (e.g., certifying that the application has been inspected for vulnerabilities using static and/or dynamic analysis techniques), and/or analytics functionality.

Reconfiguration module 108 may operate in any suitable context. In some examples, reconfiguration module 108 may operate on the computing platform as an agent that communicates with a wrapper library within the application. Additionally or alternatively, reconfiguration module 108 may operate on the computing platform to wrap the application with an application wrapper. In some examples, reconfiguration module 108 may operate on a separate computing device (e.g., that acts as a proxy between a digital distribution platform and the computing platform) and reconfigure the application (e.g., by wrapping the application and/or communicating with a wrapper library within the application) before forwarding the reconfigured application to the computing platform.

Reconfiguration module 108 may reconfigure the application with respect to any of a variety of permissions and/or behaviors. In some examples, reconfiguration module 108 may reconfigure the application to intercept and interfere with attempts by the application to access information that implicates privacy of a user of the computing platform. In one example, reconfiguration module 108 may reconfigure the application to access false information in place of accurate information. For example, reconfiguration module 108 may reconfigure the application to access false information about a location of the computing platform, a telephone number of the computing platform, a unique identifier of the computing platform, and/or contact information stored on the computing platform. In these examples, a user may provide the false information for reconfiguration module 108. Additionally or alternatively, reconfiguration module 108 may generate the false information. In some examples, reconfiguration module 108 may reconfigure the application to access imprecise information. For example, reconfiguration module 108 may reconfigure the application to modify location data of the computing platform to make the location data less precise (e.g., by providing less detail about the location of the computing platform, by randomly altering the reported location of the computing platform up to a maximum specified distance, etc.).

In some examples, reconfiguration module 108 may reconfigure the application to intercept and interfere with attempts by the application to access one or more resources. For example, reconfiguration module 108 may reconfigure the application to interfere with attempts by the application to access a network connection on the computing platform (e.g., presenting no network connection to the application when the computing platform is connected to a network). As another example, reconfiguring module 108 may reconfigure the application to interfere with attempts by the application to access a positioning device on the computing platform. In some examples, reconfiguration module 108 may reconfigure the application to prevent the application from executing in the background of the computing platform. For example, the computing platform may be designed to execute one application as a foreground application while remaining applications may execute and/or wait as background applications. Accordingly, reconfiguration module 108 may reconfigure the application to suspend and/or quit when placed in the background instead of executing.

As used herein, the phrase "foreground application" may refer to any application that is currently displayed and/or currently prominently displayed on a computing platform. Additionally or alternatively, the phrase "foreground application" may refer to an application that has the highest execution priority. In some examples, the phrase "foreground application" may exclude system services, system interface programs, and/or interface applications which temporarily overlay and/or share screen space with the current foreground application. Additionally or alternatively, the phrase "foreground application" may refer to an application whose display consumes more than half of the display area of the mobile computing device.

In some examples, reconfiguration module 108 may reconfigure the application to accept an instruction to fully terminate. For example, the application may be originally configured to continue running in the background after a user attempts to exit the application. Accordingly, reconfiguration module 108 may reconfigure the application to facilitate a complete termination of the application.

In some examples, reconfiguration module 108 may operate within exemplary system 400 in FIG. 4. For example, at step 306 reconfiguration module 108 may, as a part of wrapping server 406, reconfigure application 410 to intercept and interfere with attempts by application 410 to use a permission of computing platforms such as mobile computing device 402. Reconfiguration module 108 may thereby generate reconfigured application 416 (and, e.g., provide reconfigured application 416 to mobile computing device 402).

Returning to FIG. 3, at step 308 one or more of the systems described herein may determine that an updated version of the application is available via the application repository. For example, at step 308 determination module 110 may, as part of computing device 202 in FIG. 2, determine that an updated version of application 210 (e.g., updated application 220) is available via application 210 repository.

Determination module 110 may determine that the updated version of the application is available in any of a variety of ways. For example, determination module 110 may operate as a part of the computing platform and determine that the updated version of the application is available by receiving a message from the application repository that the updated version of the application is available. Additionally or alternatively, determination module 110 may determine that the updated version of the application is available by determining that the application has been updated on the computing platform.

In some examples, determination module 110 may operate on a separate computing device (e.g., a device that acts as a proxy between the application repository and the computing platform). Accordingly, determination module 110 may determine that the updated version of the application is available by monitoring the application repository for the updated version of the application. By monitoring the application repository, determination module 110 may ensure that the computing platform and/or a user of the computing platform is kept up-to-date with the latest version of reconfigured applications. In some examples, the original application may be digitally signed, and a native update manager on the computing platform may depend on the digital signature to identify the application within the application repository to monitor the application for updates. In cases where reconfiguration module 108 reconfigures the application by wrapping the application with an application wrapper, reconfiguration module 108 may also re-sign the application, thereby changing the digital signature of the application. Accordingly, determination module 110 may use the original digital signature of the application (and/or additional identifying information of the application, such as the name of the application, the publisher of the application, etc.) to monitor the application repository for updates to the application.

In some examples, determination module 110 may operate within exemplary system 400 in FIG. 4. For example, at step 308 determination module 110 may, as a part of wrapping server 406, determine that an updated version of application 410 (e.g., an updated application 420) is available from application repository 408.

Returning to FIG. 3, at step 310 one or more of the systems described herein may reconfigure the updated version of the application to intercept and interfere with attempts by the application to use the permission in response to an instruction to update the application. For example, at step 310 updating module 112 may, as part of computing device 202 in FIG. 2, reconfigure the updated application 220 to intercept and interfere with attempts by updated application 220 to use permission 212 in response to instruction 218 to update application 210 (e.g., resulting in reconfigured updated application 222).

Updating module 112 may reconfigure the updated version of the application to intercept and interfere with attempts by the application to use the permission in any of a variety of ways. In some examples, updating module 112 may wrap the updated version of the application in an application wrapper that intercepts and interferes with attempts by the application to use the permission. The application wrapper may include one or more computer-executable instructions configured to intercept one or more system calls and/or application programming interface calls to the computing platform by the updated version of the application that would enable the application to access a feature of the computing platform according to the permission. The application wrapper may also include instructions that block the intercepted call, add instructions to the intercepted call, and/or replace the intercepted call with different instructions. Updating module 112 and/or the application wrapper may use any suitable hooking technique to intercept and modify calls by the updated version of the application. For example, updating module 112 may modify a lookup table for application programming interface calls to redirect to instructions provided within the application wrapper.

In some examples, updating module 112 may reconfigure the updated version of the application to intercept and interfere with attempts by the application to use the permission by providing settings to the updated version of the application via a library included within the application. For example, a wrapper library may be made available to application developers (e.g., to enhance functionality of applications). Updating module 112 may communicate with the wrapper library within the updated version of the application to specify which application programming interface calls to hook and/or what instructions are to replace application programming interface calls that use specified permissions and/or features and/or that cause specified behaviors. As mentioned above, in some examples the wrapper library may also provide additional functionality to the updated version of the application. For example, the wrapper library may provide single sign-on functionality, cloud-based storage functionality, virtual private network functionality at the application level, application certification functionality (e.g., certifying that the updated version of the application has been inspected for vulnerabilities using static and/or dynamic analysis techniques), and/or analytics functionality.

Updating module 112 may operate in any suitable context. In some examples, updating module 112 may operate on the computing platform as an agent that communicates with a wrapper library within the updated version of the application. Additionally or alternatively, updating module 112 may operate on the computing platform to wrap the updated version of the application with an application wrapper. In some examples, updating module 112 may operate on a separate computing device (e.g., that acts as a proxy between a digital distribution platform and the computing platform) and reconfigure the updated version of the application (e.g., by wrapping the updated version of the application and/or communicating with a wrapper library within the updated version of the application) before forwarding the reconfigured application to the computing platform.

Updating module 112 may reconfigure the updated version of the application with respect to any of a variety of permissions and/or behaviors. For example, updating module 112 may reconfigure the updated version of the application to interfere with the same features, permissions, and/or behaviors as the systems described herein did with respect to the previous version of the application. Additionally or alternatively, updating module 112 may determine that the updated version of the application requests and/or requires permissions that the previous version of the application did not. In this example, updating module 112 may identify a request (e.g., by reading a configuration file, receiving input from a user and/or administrator, etc.) to restrict one or more of the newly required permissions and reconfigure the updated version of the application to intercept and interfere with the newly required permissions as well.

In some examples, updating module 112 may operate within exemplary system 400 in FIG. 4. For example, at step 310 updating module 112 may, as a part of wrapping server 406, reconfigure updated application 420 to intercept and interfere with attempts by updated application 420 to use a permission of computing platforms such as mobile computing device 402. Updating module 112 may thereby generate reconfigured updated application 422 (and, e.g., provide reconfigured updated application 422 to mobile computing device 402 as an update to reconfigured application 416).

As explained above in connection with method 300 in FIG. 3, by reconfiguring applications to control the applications' attempts to use permissions, the systems and methods described herein may enable users to install applications and customize what information the applications can access and/or what actions the applications can perform. Furthermore, by facilitating the updating of these applications and reconfiguring the updated versions of these applications to continue control of the applications' attempts to use permissions, these systems and methods may ensure that user experience of the applications is unhindered.

In one example, a user may create an account with and log in to a portal that appears as an application store. The user may see a list of the applications installed on the user's computing device. The user and/or an administrator may specify policies related to privacy and application behaviors that the user and/or administrator wants controlled, modified, and/or constrained within applications (such as obscuring or lying about the location of the computing device; providing a dummy phone number, a dummy Unique Device Identifier (UDID), a dummy International Mobile Equipment Identity (IMEI), false contact information, or false calendar entries; disabling the application from executing in the background when the application is not being used; disabling network and/or GPS usage; providing the ability to fully and deeply stop an application with one click to preserve battery resources and improve performance, etc.).

The user and/or administrator may upload applications for wrapping and publishing to the personalized portal for the user (or point the portal to an original source to obtain the application). The wrapping performed by the portal may enforce the policies specified by the user and/or administrator. The user may use an App Center Agent on his or her devices to access the personalized portal to get applications that have been published there and to manage updates to them. The portal may monitor the original source of the uploaded applications for updates and, when they are available, fetch, rewrap, and publish the updated applications as updates to those users who have subscribed to the application. Independent software vendor partners may, instead of having their applications be wrapped, include a wrapkit and/or Software Development Kit to enable the above-described functionality without their applications being rewrapped. In addition to privacy control, the wrapkit layer may automatically and seamlessly ease integration of third-party applications with other services provided by the wrapkit provider, such as single sign-on, cloud based storage, application certification, analytics services, etc.

Figure 5:
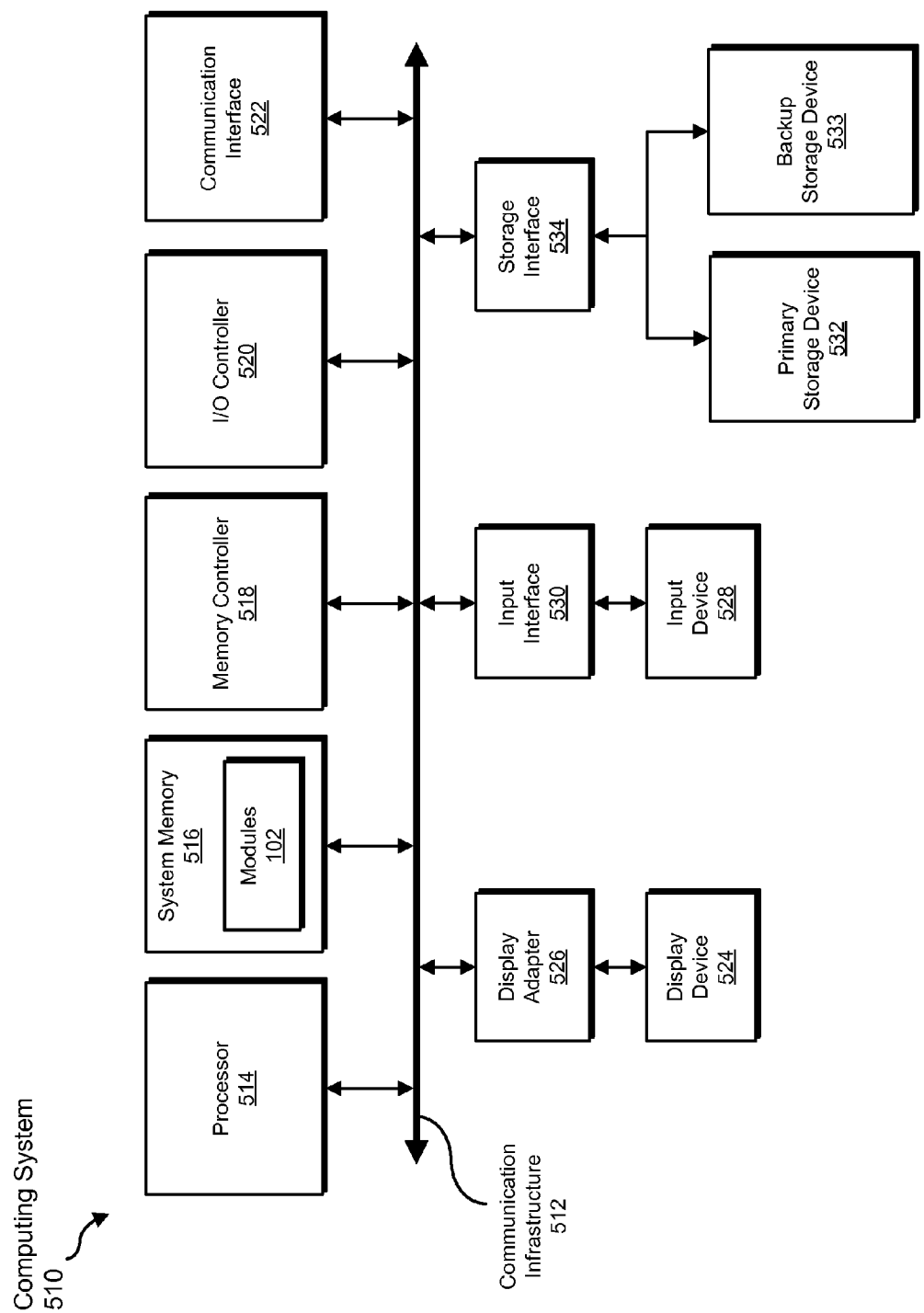
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
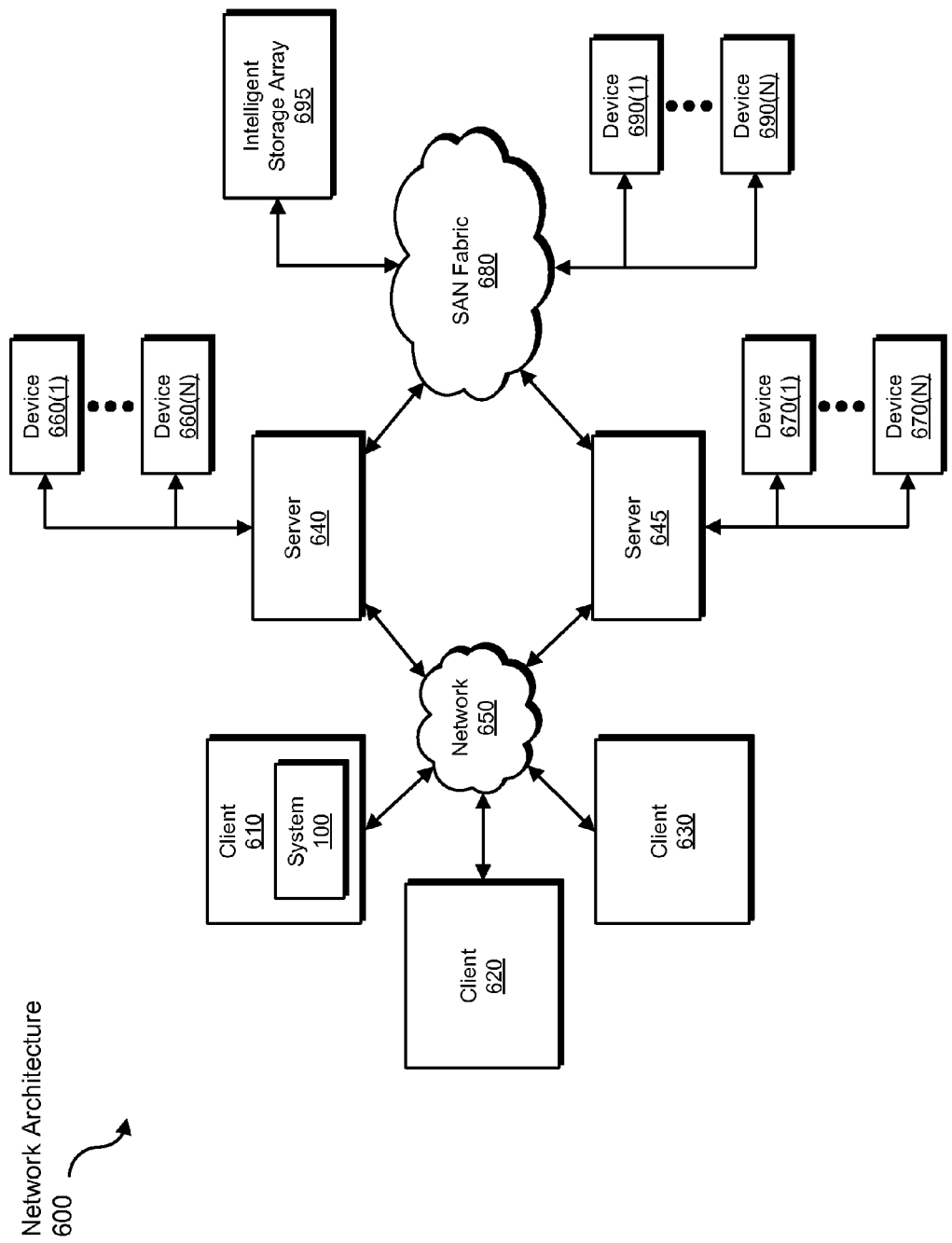
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for providing controls for application behavior.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application to be transformed, transform the application into a privacy-safe application, output the application to a storage device, use the transformed application as a replacement for the original version of the application by installing the transformed application on a computing device, and store the transformed application on the target computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing controls for application behavior, at least a portion of the method being performed by a computing device comprising at least one processor, the method comprising:
    identifying, by the computing device, an application that is distributed via an application repository and that is configured to use a permission on a computing platform that enables the application to access a feature of the computing platform;
    receiving, by the computing device, a request from a user to reconfigure the application to control attempts by the application to use the permission by intercepting and interfering with attempts by the application to use the permission;
    reconfiguring, by the computing device in response to the request from the user, the application to control attempts by the application to use the permission by intercepting and interfering with attempts by the application to use the permission;
    determining, by the computing device, that an updated version of the application is available via the application repository;
    reconfiguring the updated version of the application to continue controlling attempts by the application to use the permission based at least in part on the request from the user by intercepting and interfering with attempts by the updated version of the application to use the permission in response to an instruction to update the application.

2. The computer-implemented method of claim 1, wherein reconfiguring the updated version of the application comprises wrapping the updated version of the application in an application wrapper that intercepts and interferes with attempts by the application to use the permission.

3. The computer-implemented method of claim 2, wherein determining that the updated version of the application is available comprises monitoring the application repository for the updated version of the application.

4. The computer-implemented method of claim 1, wherein reconfiguring the updated version of the application comprises providing settings to the updated version of the application via a library included within the application.

5. The computer-implemented method of claim 4, wherein the library included within the application communicates with an agent running on the computing platform that specifies that the application is subject to reconfiguration to intercept and interfere with attempts by the application to use the permission.

6. The computer-implemented method of claim 1, wherein reconfiguring the updated version of the application comprises reconfiguring the updated version of the application to intercept and interfere with attempts by the application to access information that implicates privacy of a user of the computing platform.

7. The computer-implemented method of claim 1, wherein reconfiguring the updated version of the application comprises reconfiguring the updated version of the application to access false information about at least one of:
    a location of the computing platform;
    a telephone number of the computing platform;
    a unique identifier of the computing platform;
    contact information stored on the computing platform.

8. The computer-implemented method of claim 1, wherein reconfiguring the updated version of the application comprises preventing the updated version of the application from at least one of:
    accessing a network connection on the computing platform;
    accessing a positioning device on the computing platform;
    executing in the background of the computing platform.

9. The computer-implemented method of claim 1, wherein receiving the request to reconfigure the application to intercept and interfere with attempts by the application to use the permission comprises:
    displaying a representation of the permission via a graphical user interface;
    displaying a representation of the application via the graphical user interface;
    receiving a selection via the graphical user interface to interfere with use of the permission by the application.

10. The computer-implemented method of claim 1, wherein identifying the application comprises:
    identifying a reputation score for the application;
    determining, based on the reputation score, that the application is not trusted.

11. A system for providing controls for application behavior, the system comprising:
    an identification module, stored in memory, that identifies an application that is distributed via an application repository and that is configured to use a permission on a computing platform that enables the application to access a feature of the computing platform;

a receiving module, stored in memory, that receives a request from a user to reconfigure the application to control attempts by the application to use the permission by intercepting and interfering with attempts by the application to use the permission;

a reconfiguration module, stored in memory, that reconfigures the application, in response to the request from the user, to control attempts by the application to use the permission by intercepting and interfering with attempts by the application to use the permission;

a determination module, stored in memory, that determines that an updated version of the application is available via the application repository;

an updating module, stored in memory, that reconfigures the updated version of the application to continue controlling attempts by the application to use the permission based at least in part on the request from the user by intercepting and interfering with attempts by the updated version of the application to use the permission in response to an instruction to update the application;

at least one hardware processor that executes the identification module, the receiving module, the reconfiguration module, the determination module, and the updating module.

12. The system of claim 11, wherein the updating module reconfigures the updated version of the application by wrapping the updated version of the application in an application wrapper that intercepts and interferes with attempts by the application to use the permission.

13. The system of claim 12, wherein the determination module determines that the updated version of the application is available by monitoring the application repository for the updated version of the application.

14. The system of claim 11, wherein the updating module reconfigures the updated version of the application by providing settings to the updated version of the application via a library included within the application.

15. The system of claim 14, wherein the library included within the application communicates with an agent running on the computing platform that specifies that the application is subject to reconfiguration to intercept and interfere with attempts by the application to use the permission.

16. The system of claim 11, wherein the updating module reconfigures the updated version of the application by reconfiguring the updated version of the application to intercept and interfere with attempts by the application to access information that implicates privacy of a user of the computing platform.

17. The system of claim 11, wherein the updating module reconfigures the updated version of the application by reconfiguring the updated version of the application to access false information about at least one of:

a location of the computing platform;
a telephone number of the computing platform;
a unique identifier of the computing platform;
contact information stored on the computing platform.

18. The system of claim 11, wherein the updating module reconfigures the updated version of the application by preventing the updated version of the application from at least one of:

accessing a network connection on the computing platform;
accessing a positioning device on the computing platform;
executing in the background of the computing platform.

19. The system of claim 11, wherein the receiving module receives the request to reconfigure the application to intercept and interfere with attempts by the application to use the permission by:

displaying a representation of the permission via a graphical user interface;
displaying a representation of the application via the graphical user interface;
receiving a selection via the graphical user interface to interfere with use of the permission by the application.

20. A non-transitory computer-readable-storage medium comprising one or more computer-readable instructions that, when executed by at least one processor of a computing device, cause the computing device to:

identify an application that is distributed via an application repository and that is configured to use a permission on a computing platform that enables the application to access a feature of the computing platform;

receive a request from a user to reconfigure the application to control attempts by the application to use the permission by intercepting and interfering with attempts by the application to use the permission;

reconfigure the application, in response to the request from the user, to control attempts by the application to use the permission by intercepting and interfering with attempts by the application to use the permission;

determine that an updated version of the application is available via the application repository;

reconfigure the updated version of the application to continue controlling attempts by the application to use the permission based at least in part on the request from the user by intercepting and interfering with attempts by the updated version of the application to use the permission in response to an instruction to update the application.

* * * * *